United States Patent [19]

Eggeman et al.

[11] Patent Number: 4,527,684
[45] Date of Patent: Jul. 9, 1985

[54] RAM SUPPORTED SENSING SHIELD FOR POWER PRESSES

[75] Inventors: Vincent A. Eggeman; Jerome D. Bubb; Harvey R. Siegel; Francis H. Wichman, all of Fort Wayne, Ind.

[73] Assignee: Fort Wayne Truck Parts & Equipment, Inc., Fort Wayne, Ind.

[21] Appl. No.: 451,199

[22] Filed: Dec. 20, 1982

[51] Int. Cl.³ .................... B30B 15/12; F16P 3/14; F16P 3/16

[52] U.S. Cl. .................... 192/130; 192/134; 192/137; 100/53

[58] Field of Search .............. 192/134, 130, 137; 72/1, 2, 444; 100/53; 74/612

[56] References Cited

U.S. PATENT DOCUMENTS

| | | | |
|---|---|---|---|
| 1,206,847 | 12/1916 | Horton | 192/137 |
| 1,843,077 | 1/1932 | Bayrer | 192/137 |
| 2,049,990 | 8/1936 | Armstrong | 192/137 |
| 2,531,837 | 11/1950 | Beebe | 192/134 X |
| 2,683,515 | 7/1954 | Horn et al. | 192/134 |
| 3,129,799 | 4/1964 | Dean et al. | 100/53 X |
| 3,186,256 | 6/1965 | Reznick | 72/1 X |
| 3,240,310 | 3/1966 | Sandeman | 192/134 |
| 3,276,557 | 10/1966 | Brown | 192/139 |
| 4,030,364 | 6/1977 | Atwood | 100/53 X |
| 4,036,343 | 7/1977 | McPhee | 192/134 |
| 4,044,445 | 8/1977 | Douri | 192/134 X |
| 4,060,160 | 11/1977 | Lieber | 192/134 |
| 4,070,940 | 1/1978 | McDaniel et al. | 192/130 X |
| 4,131,189 | 12/1978 | Stephans | 192/134 X |
| 4,220,032 | 9/1980 | Smith, Jr. | 192/134 X |
| 4,321,841 | 3/1982 | Felix | 100/53 X |
| 4,357,820 | 11/1982 | Blanchard | 72/444 X |
| 4,402,389 | 9/1983 | Adams et al. | 192/134 |

FOREIGN PATENT DOCUMENTS

| | | | |
|---|---|---|---|
| 2050271 | 4/1972 | Fed. Rep. of Germany | 100/53 |
| 2234483 | 1/1974 | Fed. Rep. of Germany | 100/53 |
| 393533 | 3/1974 | U.S.S.R. | 100/53 |

Primary Examiner—Rodney H. Bonck
Assistant Examiner—David D. House
Attorney, Agent, or Firm—George A. Gust

[57] ABSTRACT

A reciprocating sensing shield for use in connection with a power press such as a press break or bending machine is operatively mounted on the press ram for relative vertical movement and is controlled to be positioned to guard the "pinch point" of the dies and furthermore to stop downward movement of the ram should an operator's fingers or hands be in the proximity to the "pinch point" just prior to the movable die arriving thereat. The ram and shield descend as a unit until the ram reaches the "pinch point" at which time the shield is positioned to cover the break thereby to prevent an operator from inserting his hands or fingers into the break. As the ram reaches the "pinch point", the sensing shield immediately raises clear of the break. As the work piece is formed by continued descent of the ram, the ram reverses (rises) and the sensing shield is carried upwardly with it. When the ram is top dead center, the sensing shield is caused to drop into its lowermost position relative to the ram and the system is in readiness for another cycle. Should an operator's hand be in the danger area beneath the sensing shield as the ram and shield are lowering, engagement with the operator's hand triggers a mechanism which stops the ram. Thus, both shielding and sensing functions are provided.

13 Claims, 13 Drawing Figures

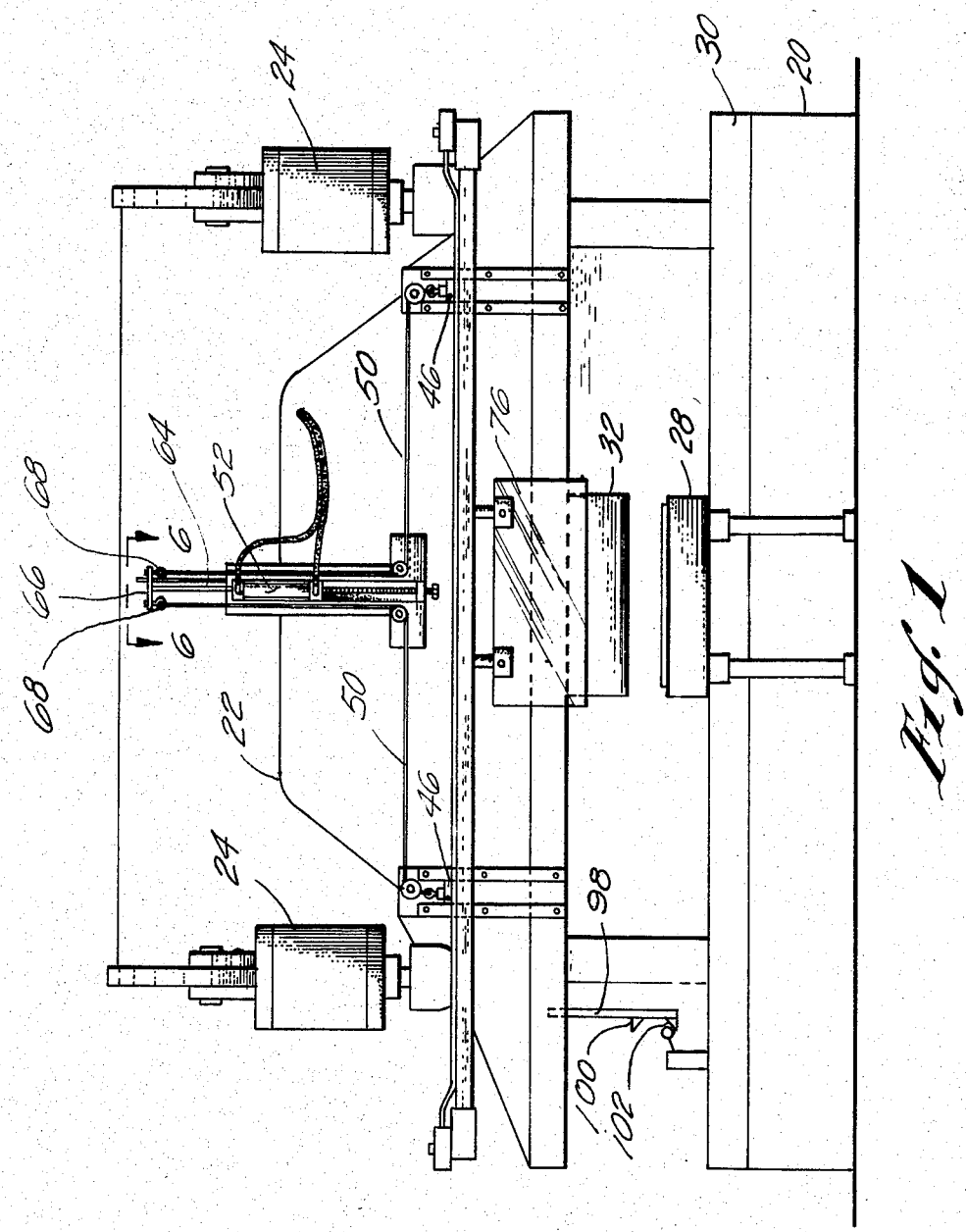

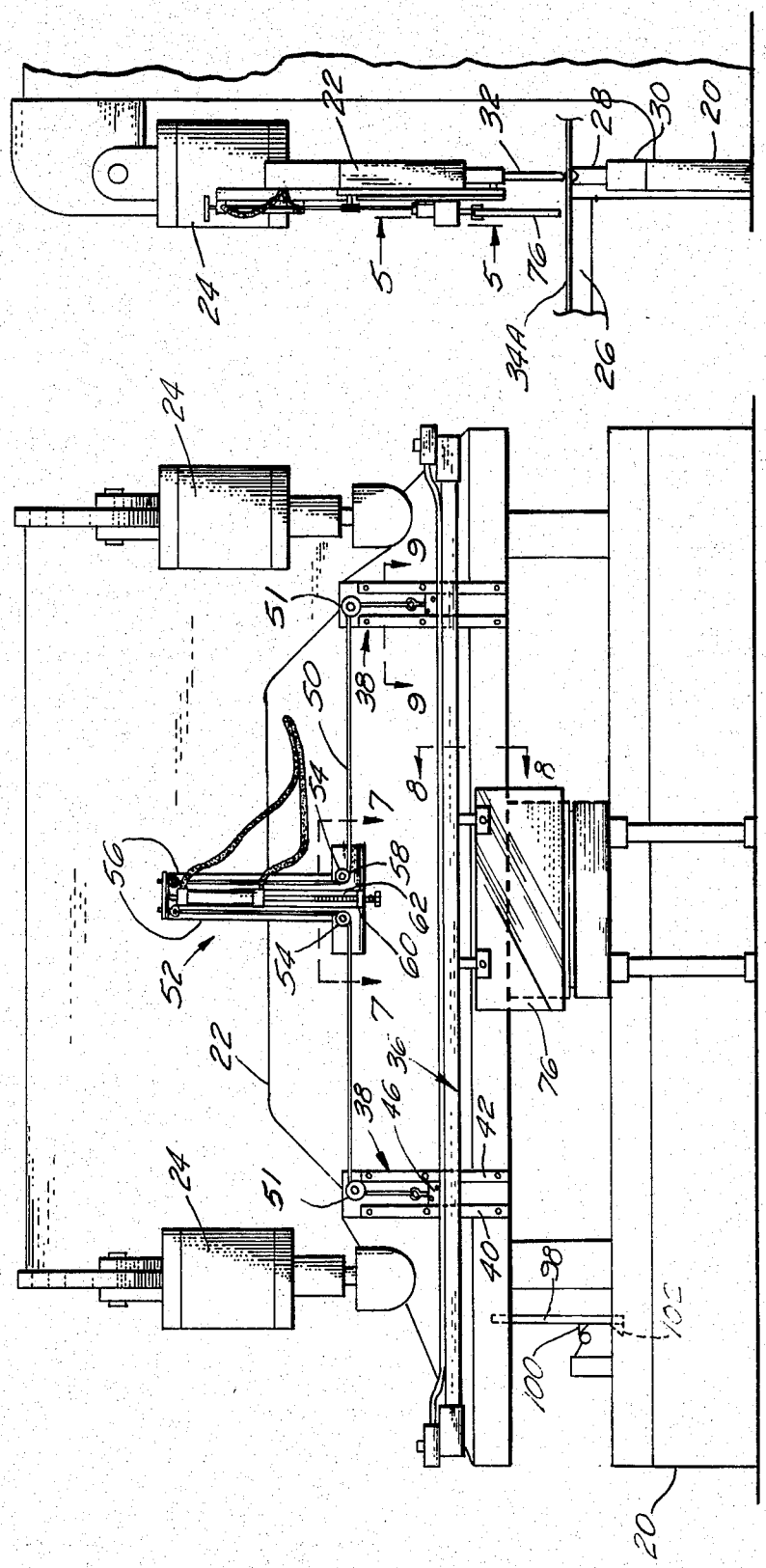

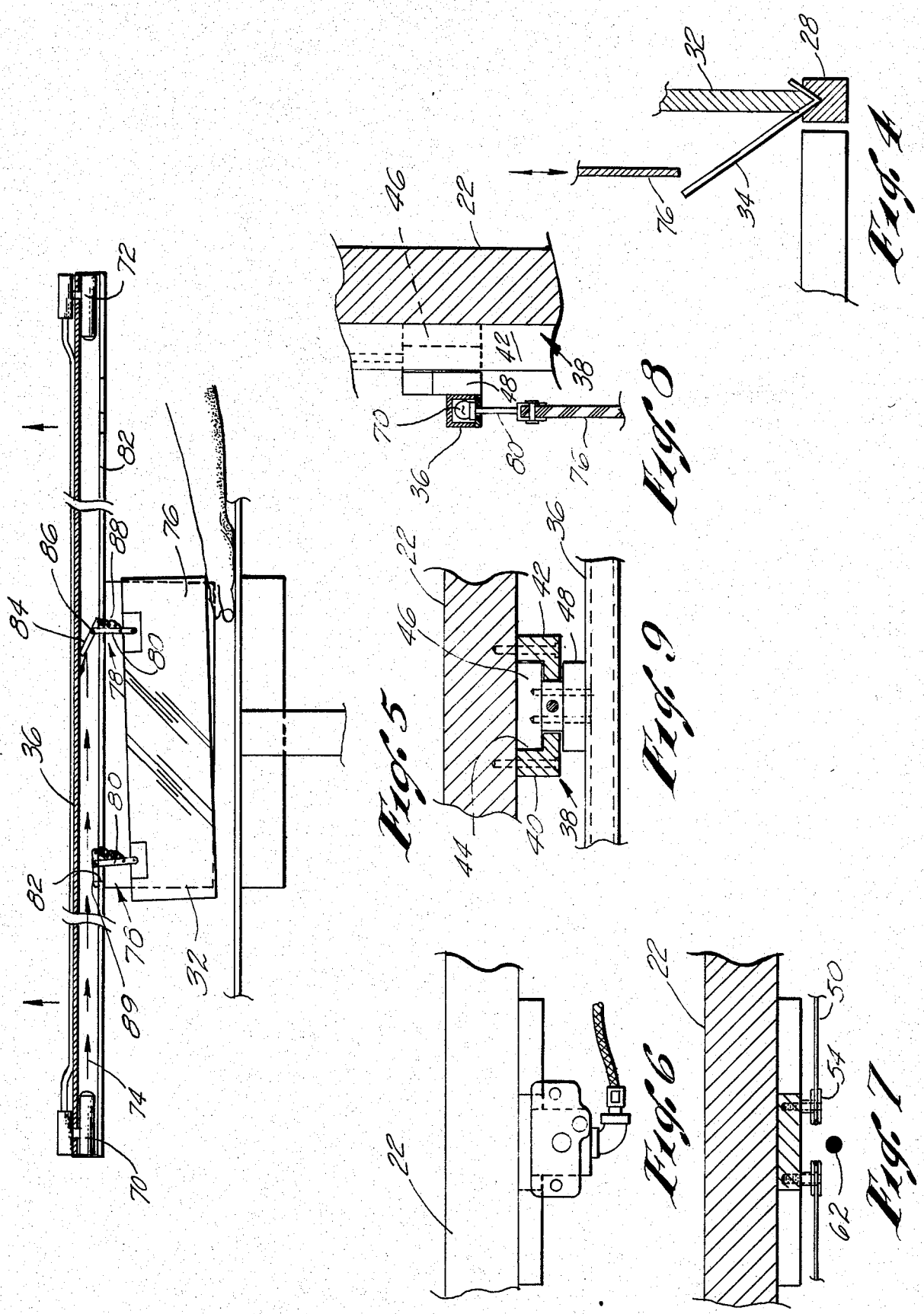

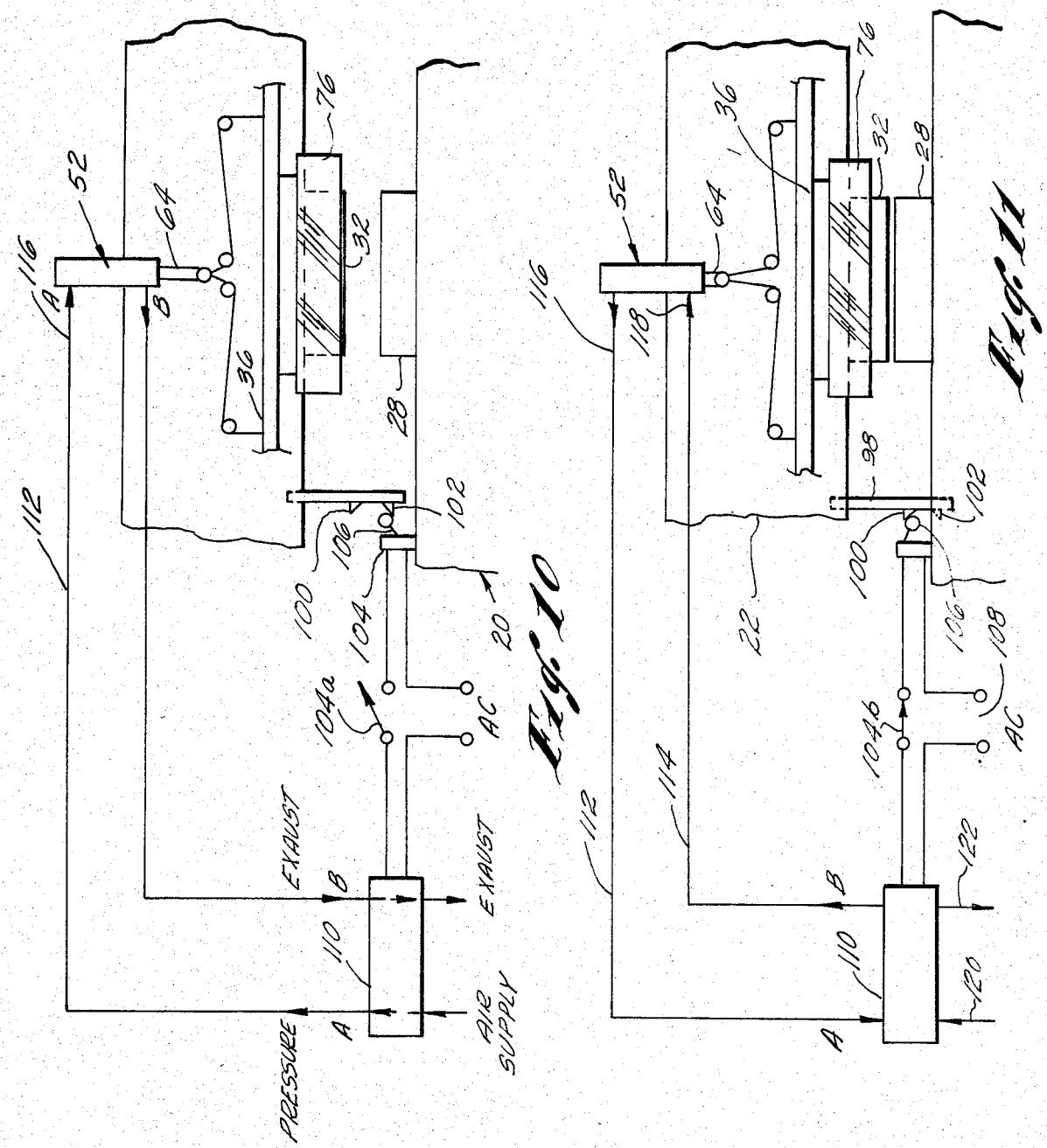

4,527,684

RAM SUPPORTED SENSING SHIELD FOR POWER PRESSES

BACKGROUND OF THE INVENTION

1. Field of the Invention

The present invention relates to power presses and more particularly to a safety device for power presses.

2. Description of the Prior Art

The prior art includes U.S. Pat. Nos. 2,311,441; 2,115,322; 2,683,515; 2,798,583; 2,826,286; 4,070,940 and 4,220,032. Reference in particular is made to U.S. Pat. No. 4,220,032 which discloses a power press of the type provided for bending, forming, punching, slitting, slicing, or cutting a workpiece, such as a piece of sheet metal. A bending machine or press break conventionally includes a fixed lower die and a movable upper die which travels with the ram for bending a workpiece positioned by a human operator in a break between the dies. Such machines are actuated by the operator, often by a foot pedal, in order to free the hands of the operator for guiding and positioning the workpiece according to guide marks at the break in the machine. Conventionally, such machines include a workpiece-receiving surface, such as a table, which is used to guide the sheet metal into the machine to a particular position. Upon actuation of the machine, the movable die is reciprocated to perform the bending function on the positioned sheet metal.

It has been a continuing problem in the art to develop a safety mechanism to prevent a human operator from inserting his hands or fingers into such machinery during the work cycle. Such machines have in the past caused serious personal injury such as loss of fingers.

With respect to the aforesaid U.S. Pat. No. 4,220,032, a transparent guard is provided which raises and lowers in substantial synchronism with the reciprocating ram. A control mechanism serves to lower the transparent guard to a position in front of the break just prior to the movable die arriving thereat such that an operator cannot insert his fingers or hands into the break since the guard constitutes an interferring barrier. However, a problem with this arrangement is that should the operator have his fingers or hand underneath the guard prior to the lowering thereof, the ram nevertheless can continue its downward descent. The impact of the guard against the fingers or hand of the operator is the only safety precaution involved, and depends upon the sense of feel, since upon feeling the guard's impingement, the operator would normally withdraw his hands thereby perhaps avoiding the dies as they come together.

SUMMARY OF THE INVENTION

The present invention constitutes an advantage over the prior art in many different respects, particularly as regards the use of a sensing shield which serves the dual purpose of not only guarding against the operator moving his hand into the break between the dies but also senses the presence of the operator's fingers or hands and stops the operation of the ram thereby preventing any injury to the operator since the machinery is thereupon disabled. Broadly speaking, this invention comprehends in combination with the power press having fixed and movable dies and a reciprocable ram which carries the movable die, means for reciprocating the ram between spaced first and second positions in which the first position is with the dies closed and the second position is with the dies open in work-receiving relation. The movable die in moving from the second position to the first position passes through a "pinch point" position in which the movable die is spaced from but is immediately adjacent to the fixed die just prior to closure.

Sensing means are provided on the machine which are movable in parallelism with the ram between two different positions, one termed a "pinch point"-covering position and the other a remote, elevated position. The sensing means senses the presence of an operator's fingers or hand in the vicinity of the dies when at or near the aforesaid "pinch point" position and furthermore guards against insertion of the operator's fingers or hand into the space of the break or "pinch point".

Actuating means are provided for moving the sensing means between the "pinch point" covering and remote positions in synchronism with the reciprocating movement of the ram such that the sensing means reaches its "pinch point" covering position substantially simultaneously with the movable die reaching its "pinch point" position and immediately thereafter the sensing means rises to its remote position.

Additionally, stroking means are provided for controlling the reciprocation of the ram and for stopping the downward movement thereof in response to the sensing means sensing the presence of an operator's fingers or hand in proximity to the "pinch point" position of the movable die.

It is an object of the invention to provide improvements in safety devices for power presses.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a front elevation of a machine having an embodiment of this invention affixed thereto;

FIG. 2 is a similar view but with the machine actuated in "down" position;

FIG. 3 is a fragmentary side view thereof with the movable die in the "pinch point" position;

FIG. 4 is a vertical sectional view similar to that of FIG. 3 showing the dies closed, a workpiece formed, and the sensing shield automatically raised out of interferring position;

FIG. 5 is a fragmentary front view taken substantially along section line 5—5 of FIG. 3, partially sectioned for clarity of illustration showing how the sensing shield may function in order to provide a sensing signal usable in stopping operation of the power press;

FIG. 6 is a fragmentary view taken substantially along section line 6—6 of FIG. 1;

FIG. 7 is another fragmentary sectional view taken substantially along section line 7—7 of FIG. 2;

FIG. 8 is another sectional view taken substantially along section line 8—8 of FIG. 2;

FIG. 9 is another sectional view taken substantially along section line 9—9 of FIG. 2;

FIG. 10 is a diagrammatic illustration showing the mechanism which interconnects the ram and sensing shield for causing the desired operation of the latter;

FIG. 11 is a view like FIG. 10 but with the ram and shield in different postions;

DESCRIPTION OF THE PREFERRED EMBODIMENT

Figures 12, 13:
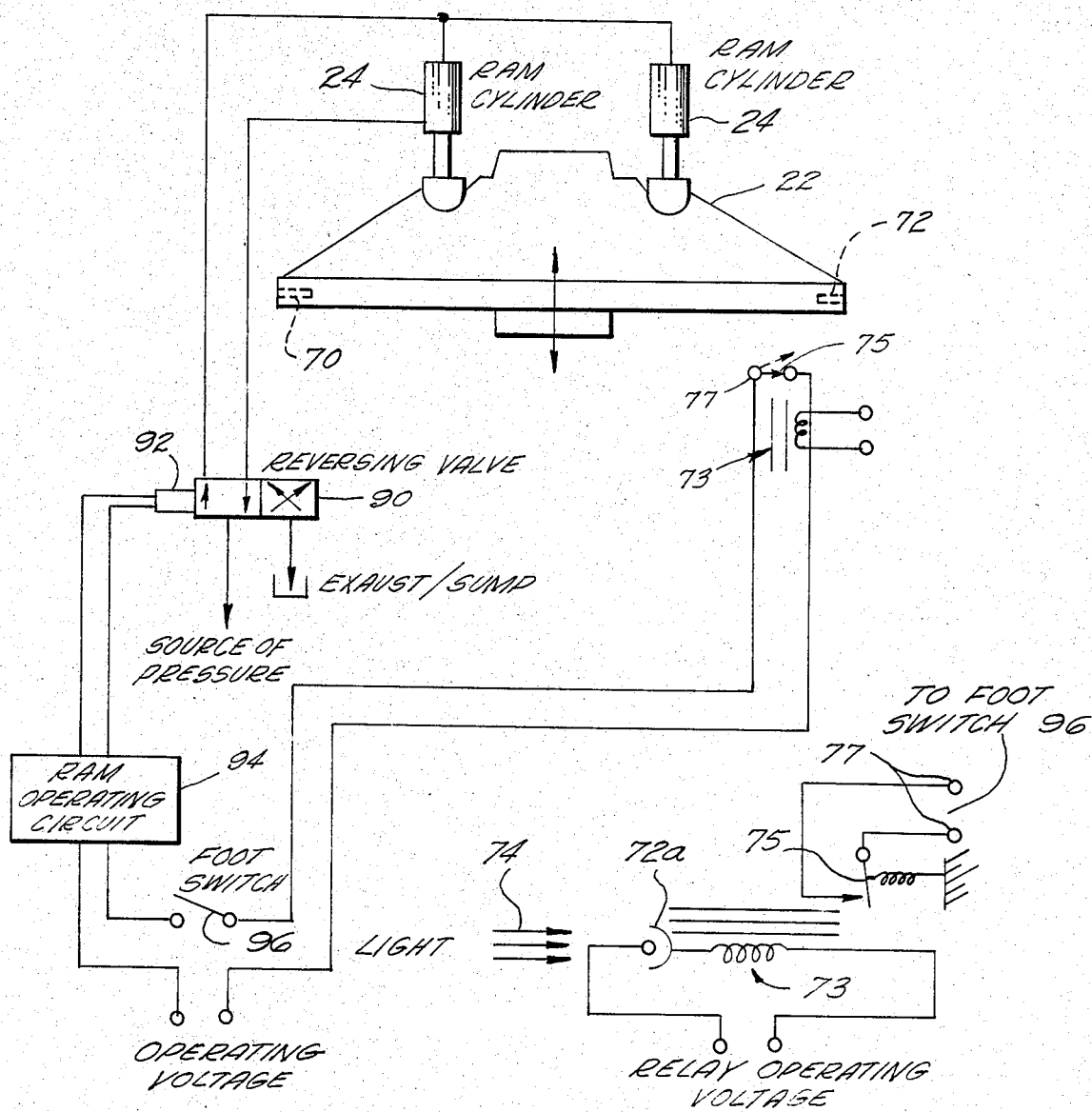
FIG. 12 is a diagrammatic illustration of a part of the control mechanism for vertically reciprocating the ram and also for stopping the ram in its downward movement in the event the sensing shield detects the presence of an operator's fingers in the proximity of the "pinch point"
FIG. 13 is another diagrammatic illustration in more detail than in FIG. 12 of the electrical-switching device for generating an electrical signal which may be utilized in stopping downward movement of the ram in the event an operator's hand is in proximity to the pinch point or press break.

Referring to the drawings, the power press therein shown is a typical, conventional press break having a stationary frame 20 upon which is carried a vertically reciprocable ram 22. For reciprocating the ram 22 are two hydraulic power cylinders 24. The stationary frame 20 includes a workpiece-receiving table 26 having a flat upper surface which is essentially coplanar with the receiving portion of a fixed die 28 mounted on a stationary pedestal portion 30 of the stationary frame 20.

The ram 22 carries the conventional moveable die 32 which vertically reciprocates with the ram 22 into and out of mating engagement with the fixed die 28. In the embodiment shown, the mating surfaces of the two dies 28 and 32 are V-shaped so as to form a workpiece 34 as shown in FIG. 4 into a corresponding V-shape. This workpiece is indicated by the numeral 34a in FIG. 3 as being a flat piece of sheet metal just prior to being coined between the two dies in the shape shown in FIG. 4.

Mounted on the ram 22 for vertical reciprocable movement relative thereto is an elongated, hollow, light bar indicated generally by the reference number 36. Mounting this bar 36 on the ram 22 is a guide assembly 38 (FIGS. 2, 8 and 9). This guide assembly 38 is composed of two elongated, identically configured bars 40 and 42 which are vertically arranged, spaced apart and parallel (see FIGS. 8 and 9 also). As shown more clearly in FIG. 9, each of these bars 40 and 42 is L-shaped in cross section thereby to provide a capture type slide cavity indicated by the numeral 44. Positioned within this slide cavity 44 is a slide block 46 which is capable of moving vertically between the two guide bars 40 and 42. Secured to this block 46 is another series of blocks indicated by the numeral 48 which projects forwardly of the two bars 40 and 42, there to be secured to the elongated bar 36 by means of threaded fasteners or the like. Thus, by moving the two blocks 46 upwardly and downwardly in unison, the bar 36 may be retained truly horizontal at all times.

For moving the elongated bar 36 vertically, a double acting power cylinder and cable system are used, there being two such cables these being indicated by the numeral 50 and the double acting power cylinder by the numeral 52 (FIGS. 1 and 2). At the top of the guide assembly 38 is mounted a pulley 51, and horizontally spaced therefrom and centrally of the ram 22 are mounted two additional pulleys 54, these latter pulleys being immediately adjacent to the power cylinder 52. This power cylinder 52 is vertically oriented and is slidably retained between two vertically arranged, spaced apart and parallel bars 56. A mounting block 58 is secured to the ram 22 by means of threaded fasteners and carries an additional block 60 having a vertically oriented hole which is threaded to receive an elongated screw 62. This screw 62 is secured at its distal end to the lower end of the power cylinder 52 such that turning of the screw 62 will result in vertical, adjusting movement of the power cylinder 52.

The piston rod of the power cylinder 52 is indicated by the numeral 64 (FIG. 1) which carries a cross bar 66 on its distal end, the opposite ends of this cross bar 66 having eyelets 68 thereon to which the ends of the two cables 50 attach. The opposite ends of these two cables 50 are in turn secured to eyelets attached to the respective blocks 46, the cables being trained around the pulleys 51 and 54 as shown. Thus, as the power cylinder 52 vertically reciprocates, the light bar 36 will be correspondingly raised and lowered yet maintained in a truly horizontal position at all times.

The light bar 36 is shown in more specific detail in FIG. 5. In the lefthand end is mounted a source 70 of light, such as a suitable lightbulb and lens combination, and in the righthand end is positioned a photo-sensitive device or photocell 72. The light source 70 (FIGS. 5 and 8) is so designed as to train continuously a beam of light indicated by the arrows 74 longitudinally through the bar 36 to impinge on the photocell 72 to cause it to change to one of its two "on" and "off" states. Thus, the photocell 72 may be considered as an "on" and "off" switch.

A transparent, flat panel or shield indicated by the numeral 76 is suspended beneath the bar 36 by means of two horizontally spaced hangers generally indicated by the numeral 78. Each of the hangers 78 includes an elongated bar 80 secured at its lower end to the shield 76 and projecting upwardly through an elongated clearance opening 82 which extends the full length in the lower side of the light bar 36 for infinite horizontal adjustment. On the upper end of the bar 80 is pivotally connected a light barrier which may be in the form of a flat element 84. The pivotal connection 86 between the upper end of the bar 80 and the barrier 84 is intermediate the ends of the latter as shown. At one end of the barrier 84 is connected a tension spring 88 which stretches downwardly to be connected to the shield or bottom end of the bar 80 as shown, this normally yieldably pivoting the barrier 84 clockwise as shown in FIG. 5 about the pivot 86. By reason of the weight of the panel or shield 76, the barrier 84 will be flattened against the bottom side of the light bar 36 as shown at 89 in the lefthand side of FIG. 5. However, if the shield 76 is raised at one corner by reason of the presence of an operator's hand therebeneath as shown, the bar 80 will be moved upwardly within the opening 82 in the light bar thereby permitting the spring 86 to pivot the barrier 84 clockwise until the lefthand edge thereof abuts against the upper wall of the bar 36. As will now be understood, if the shield 76 is suspended by its own weight and there is nothing causing relative upward movement thereof with respect to the bar 36, the barrier will be flat and the path will be clear for light from the source 70 to radiate entirely through the length of the bar 36 until it impinges upon the photocell 72. However, if the shield 76 is raised either totally or at one corner as shown in FIG. 5, one of the two barriers 84 will be operated to cut off the light beam and prevent its impingement on the photocell 72. Thus, the photocell 72 becomes a detector of the relative position of the shield 76 with respect to the bar 36.

It may be stated at this point that vertical reciprocation of the ram 22 will result in corresponding movement of the light bar 36 so long as the power cylinder 52 is non-actuated. However, if the cylinder 52 is actuated, the bar 36 will be moved vertically relative to the ram 22.

The power press, as stated previously, is of conventional design and is provided with a control mechanism in the form of hydraulic, pneumatic and electrical circuitry by means of which an operator can control the vertical movement of the ram 22 so as to form a workpiece as shown in FIG. 4. This mechanism is shown diagrammatically in FIG. 12. This mechanism will include one or more hydraulic reversing valves 90 connected between the ram cylinders 24 and a suitable source of hydraulic fluid under pressure. A pilot 92 for this reversing valve 90 is connected to an electrical circuit indicated generally by the numeral 94 which includes a conventional foot switch 96. The system in one conventional mode of operation is so arranged that ram 22 will be operated only while the operator's foot is closing the switch 96, and at any time should the operator's foot be lifted to permit the switch to open, the machine would be caused to stop in its operation.

In one suitable hookup, the photocell 72, indicated as being in circuit with an electrical switch (FIG. 12), is operatively connected in series with the foot switch 96. So long as light from the source 70 shines on the photocell 72, the switch 75 in FIG. 12 will be closed thereby completing the circuit to the foot switch 96. Closure of the foot switch 96 thus causes normal operation of the ram 22. However, if the light beam to the photocell 72 is interrupted so as to open the switch 75 (FIG. 12) the electrical circuit is interrupted in such a manner as to stop operation of the ram 22. Furthermore, the control mechanism which includes the parts 90, 92 and 94 may be so arranged in a conventional setup that if the circuit which includes the foot switch 96 is broken, the ram 22 not only is stopped in its downward movement but is caused to reverse upwardly to its position of top dead center. Thus, opening of the switch 72 can cause the same stopping and upward reversing movement of the ram 22.

With further reference to the sensing means which includes the shield 76, the bar 36 and the associated mechanism including that for mounting the bar 36 and shield 76 on the ram 22, attention is directed to FIGS. 1, 2, 10 and 11 in particular. The orientation of cylinder 52 in FIGS. 10 and 11 is reversed as compared to the earlier figures for clairty of illustration. Secured to and depending from the ram 22 is an elongated supporting bar 98 which carries two vertically spaced cam lobes 100 and 102. On the stationary frame 20 is mounted a simple electrical, on-off switch 104 having an operating arm 106 which is operatively engageable sequentially with the lobes 100 and 102. In FIG. 10 the arm 106 is shown as being in engagement with the lobe 102 which has moved the switch arm 106 upwardly so as to open the contacts of the switch 104 as indicated diagrammatically by the numeral 104a. In FIG. 11 the ram 22 is shown as being moved downwardly to a "dies closed" position at which the lobe 100 has engaged the arm 106 to cause closure of the contacts of the switch 104 as diagrammatically illustrated by the numeral 104b. Thus, between the extreme upper and lower positions of the ram 22, the switch 104 will be oppositely actuated between open and closed positions.

The switch 104 (FIGS. 10 and 11) is in circuit with a source of energizing potential 108 and an electrically operated, pneumatic, reversing valve 110 (FIGS. 10 and 11) having operating ports connected by means of air lines 112 and 114 to the opposite ports 116 and 118 of the power cylinder 52. A suitable source of air under pressure is connected to port 120 of the valve 110 and the same valve is provided with an exhaust outlet 122. Suffice it to say, the valve 110 is conventional and requires no further description.

In FIGS. 1 and 10, the ram 22 is shown in its uppermost position at which the upper and lower dies 32 and 28, respectively, are completely vertically separated. The contacts of switch 104 are open as indicated at 104a and the electrical circuit to the air valve 110 is interrupted. This causes the valve 110 to operate the power cylinder 52 in a direction to move the piston rod 64 as will lower the light bar 36 and the guard 76 downwardly to the lowermost position relative to the ram 22. In this lowermost position, the guard 76 will overlie in horizontal registry the upper die 32 such that the lower edge of the shield 76 lies in substantially the same horizontal plane with the lower edge of the upper die 32.

Referring to FIGS. 4 and 11, here the ram 22 is completely lowered to its "dies closed" position. The switch 104 has been operated to close the contacts thereof as indicated by the numeral 104b thereby applying energizing potential to the reversing valve 110 which causes operation of the power cylinder 52 in a direction to move the piston rod 64 for pulling the bar 36 and guard 76 to the uppermost position relative to the ram 22. Thus, with each normal reciprocating stroke of the ram 22, the power cylinder 52 will be operated oppositely to cause reciprocating vertical movement between upper and lower limits, relative to the ram 22, of the combination bar 36 and shield 76.

Still referring to the cam-operating means 98, 104, the lobes 100 and 102 are precisely located relative to the switch 104 as to raise and lower the shield 76 at precise moments with respect to the instantaneous position of the ram 22. For example, when the ram 22 is in its uppermost position, the switch 104 is operated thereby to position the shield 76 in covering relation to the upper die 32. As the ram 22 lowers, the shield 76 along with the bar 36 and air cylinder 52 lower in unison therewith, there being no relative movement between the shield 76 and the ram 22. When the ram 22 lowers far enough to position the dies 28 and 32 in closely spaced relation, otherwise referred to as the "pinch point", the lobe 100 engages the switch arm 106 to operate the switch 104 for closing the contacts 104b thereof as shown. This causes actuation of the power cylinder 52 for raising the guard 76 to the position shown in FIG. 11. Recapitulating, as the upper die 32 reaches the "pinch point", the guard 76 is retracted upwardly relative to the ram 22. However, the ram continues its downward movement causing closure of the two dies 32 and 28 onto the workpiece 34 as shown in FIG. 4. Once the closure has been effected and the workpiece 34 formed, the control mechanism 90, 94, which is conventional as previously explained, causes reversing, upward movement of the ram 22 until it reaches its topmost position.

The "pinch point" is illustrated in FIGS. 2 and 3 and is a conventional step in the operation of a press break, this "pinch point" being indicative of the two dies 28 and 32 being immediately adjacent but slightly spaced apart, such as one-quarter inch ($\frac{1}{4}''$), just prior to engagement with the workpiece. It is considered that when the dies are at the "pinch point", danger no longer exists with respect to the operator getting his fingers into the space between the dies.

The shield 76, therefore, accompanies the ram 22 and the die 32 which it is covering, in its downward movement until the die 32 reaches the "pinch point", at which time the cam lobe 100 operates the switch 104 to cause reversal of the power cylinder 52 thereby to raise immediately the shield 76 to the position illustrated in FIG. 11, this being the uppermost position relative to the ram 22. The shield 76 constitutes a barrier, of course, against an operator moving his hands or fingers therepast and into the space between the two dies, especially as the shield 76 approaches its lowermost position which otherwise is termed as the "pinch point"-covering position.

Should the operator, in feeding a workpiece 34a (FIG. 3) into the space between the dies accidentally insert his fingers far enough so as to position them beneath the shield 76, as the latter lowers to the "pinch point"-covering position, it will engage the operator's hand as shown in FIG. 5 causing relative upward movement of the shield 76 with respect to the light bar 36 and the consequent operation of the photo-sensitive switch 72 as previously explained. The downward travel of the ram 22 is thereupon halted, and if the control mechanism is so arranged, will reverse upwardly to its starting position. Thus, the shield 76 constitutes a part of the sensing means for sensing the presence of an operator's hand in the position of being too close to or perhaps between closing dies. The shield 76 thus not only serves as a barrier against movement of the operator's hand toward the dies but also as a means for sensing the presence of the operator's hands in the region which is too close to the two dies.

A further reason exists for causing the shield 76 to rise at the moment the upper die 32 reaches the "pinch point" position. FIG. 3 shows the die 32 in its "pinch point" position and the shield 76 in its "pinch point"-covering position. At this precise moment, as already explained, the switch 104 is operated to cause reversing movement of the power cylinder 52 which causes the shield 76 to rise promptly to the position as shown in FIGS. 4 and 11. As the die 32 continues its downward movement into forming engagement with the workpiece 34 and lower die 28, the workpiece 34 is bent forcing a part thereof upwardly as shown. Since the shield 76 is raised clear, there can be no contact between the shield and the workpiece or damage to the shield by sudden impact of the workpiece thereagainst during the forming operation.

The photo-sensitive switch device 72 may be embodied in any number of different forms. One such form is shown in FIG. 13 wherein the photocell 72 is indicated by the numeral 72a and connected into an electrical circuit with an operating voltage and a switching relay 73. The relay 73 has a switch element or contact 75 which is normally spring biased open and terminals 77 adapted to be series connected with the foot switch 96. With light 74 from lamp 70 irradiating the photocell 72, 72a, the relay 73 is energized causing closure of the switch or switch contact 75. This provides an electrical circuit to the foot switch 96 such that upon its closure, the press break is actuated to stroke normally.

Recapitulating, for normal operation, with the ram 22 at top dead center, the sensing shield 76 is in its "down" position relative to the ram 22 but is far above the break ("pinch point") of the two dies. As the ram 22 descends, the sensing shield 76 descends as a unit therewith. The sensing shield does not cover the break for the bulk of the descending movement of the ram 22. The ram 22 and shield 76 continue descending as a unit until the ram 22 reaches the "pinch point". Here, the shield 76 does effectively cover or overlie the break or "pinch point".

As the ram reaches the "pinch point", the sensing shield 76 immediately raises clear as shown in FIGS. 4 and 11. As the workpiece 34 is formed by continued descent of the upper die 32, the ram 22 reverses (rises) and the sensing shield 76 is carried upwardly in unison therewith. The conventional control mechanism 90, 94 causes the ram 22 to rise upon completion of the forming stroke.

When the ram 22 reaches top dead center, the sensing shield 76 is caused to drop to its lowermost position as shown in FIG. 10 relative to the ram 22. Now the system is in readiness for another cycle.

If an operator's hand should be in the danger area beneath the sensing shield 76 as the ram and the shield is in the process of lowering, the moment the shield engages the operator's hand, a mechanism is triggered which stops the ram, and in a specific embodiment of the invention, causes the ram to reverse upwardly. Thus, the shield 76 serves not only as a barrier but also as a sensing device.

In a working embodiment of this invention, the power press is conventional and is a Cincinnati Model 400H as manufactured by The Cincinnati Shaper Company, Cincinnati, Ohio. While the sensing shield invention is shown as being mounted thereon, it will occur as obvious to persons skilled in the art that the same sensing mechanism may be used in conjunction with other presses so long as the photo-sensing switch in the light bar is connected into the control mechanism of the press to stop its operation should the sensing shield 76 detect the presence of an operator's hand in the danger region.

While there have been described above the principals of this invention in connection with specific apparatus, it is to be clearly understood that this description is made only by way of an example and not as a limitation to the scope of the invention.

What is claimed is:

1. In combination with a power press having fixed and movable dies and a reciprocable ram which carries said movable die, means for reciprocating said ram between spaced first and second positions in which said first position is with said dies closed and said second position is with said dies open in work-receiving condition, said movable die in moving from said second position to said first position passing through a "pinch point" position in which said movable die is spaced from but immediately adjacent to said fixed die just prior to closure, sensing means carried by said ram and movable in parallelism with said ram between "pinch point" covering and remote positions for sensing an operator's fingers or hand in the vincinity of said dies when at or near said "pinch point" position and also for guarding against insertion of the operator's fingers of hand into the space of such "pinch point" position, the sensing means including a light source, a photoelectric device, a light path between the light source and photoelectric device, and means movable between a retracted position and a light pathway blocking position with such movement providing the aforementioned sensing of an operator's fingers of hand in the vicinity of the dies, actuating means including a power device interconnecting said ram and said sensing means for moving said sensing means between said "pinch point" covering and remote positions in synchronism with the reciprocating movement of said ram such that said sensing means move in unison with the ram and reaches its "pinch point" covering position substantially simultaneously with said movable die reaching its "pinch point" position and immediately thereafter the actuating means induces relative motion between the sensing means and ram and said sensing means moves to said remote position, stroking means for controlling the reciprocation of said ram and for stopping downward movement of said ram in the direction from said second to said first positions in response to said sensing means sensing the presence of an operator's fingers or hand in proximity to said "pinch point" position of said movable die.

2. The improvement as set forth in claim 1 wherein said stroking means includes a swtiching device operatively carried by said ram and responsive to sensing by said sensing means of an operator's fingers of hand as aforesaid thereby to cause said ram to stop in its downward movement to prevent closure of said dies.

3. The improvement of claim 2 wherin said sensing means includes a flat panel lying in a plane essentially parallel to the direction of movement of said ram and which covers substantially the region of the "pinch point" of said dies, said flat panel being movably mounted on said ram, and means connecting said switching device to said panel for operating said switching device as a consequence of movement of said panel relative to said ram upon engagement of said panel with the fingers or hand of an operator, said relative movement constituting the aforesaid sensing of an operator's fingers or hand in the vicinity of the dies.

4. The combination of claim 1 wherein said stroking means includes further control means for reversing upwardly said ram immediately upon said stopping thereof.

5. The combination of claim 4 wherein said sensing means includes a flat panel lying in a plane essentially parallel to the direction of movement of said ram and which covers substantially the region of the "pinch point" of said dies, said flat panel being movably mounted on said ram, and means connecting said switching device to said panel for operating said switching device as a consequence to movement of said panel relative to said ram upon engagement of said panel with the fingers or hand of an operator, said relative movement constituting the aforesaid sensing of an operator's fingers of hand in the vicinity of the dies.

6. The combination of claim 1 wherein said actuating means includes a switching cam on one of said ram and a stationary mount and a switch on the other thereof, said switch having an arm engageable alternately with spaced portions on said switching cam in response to vertical reciprocatory movement of said ram thereby to actuate said sensing means.

7. In combination with a power press having fixed and movable dies and a reciprocable ram which carries said movable die, means for reciprocating said ram between space first and second positions in which said first position is with said dies closed and said second position is with said dies open in work-receiving condition, said movable die in moving from said second position to said first position passing through a "pinch point" position in which said movable die is spaced from but immediately adjacent to said fixed die just prior to closure, sensing means carried by and relatively movable in parallelism with said ram between "pinch point" covering and remote positions for sensing an operator's fingers or hand in the vicinity of said dies when at or near said "pinch point" position and also for guarding against insertion of the operator's fingers of hand into the space of such "pinch point" position, actuating means including a power device carried by said ram for moving said sensing means between said "pinch point" covering and remote positions in synchronism with the reciprocating movement of said ram such that said sensing means reaches its "pinch point" covering position substantially simultaneously with said movable die reaching its "pinch point" position and immediately thereafter said sensing means moves to said remote position, stroking means including a switching device operatively carried by said ram for controlling the reciprocation of said ram and for stopping downward movement of said ram in the direction from said second to said first positions in response to said sensing means sensing the presence of an operator's fingers or hand in proximity to said "pinch point" position of said movable die, said sensing means including a flat panel lying in a plane essentially parallel to the direction of movement of said ram and which covers substantially the region of the "pinch point" of said dies, said flat panel being movably mounted on said ram, and means connecting said switching device to said panel for operating said switching device as a consequence of movement of said panel relative to said ram upon engagement of said panel with the fingers or hands of an operator, said relative movement constituting the aforesaid sensing of an operator's fingers or hand in the vicinity of the dies, the switching device including an elongated, hollow bar having a light source in one end which directs radiation through said bar to the opposite end, a photosensing device in said opposite end having a switching characteristic between "on" and "off" states depending upon whether or not said radiation impinges thereon; said connecting means including a hanger suspending said panel from said bar, said hanger including a light barrier mounted within said bar and movable between light-blocking and light-passing positions, said barrier being movable into light-blocking position in response to upward movement of said panel and into light-passing position upon downward movement into suspended condition of said panel.

8. The improvement of claim 7 wherein said hanger includes an elongated element connected at one end to said panel and at the other end to said barrier, said element passing through a clearance opening in said bar so as to be vertically movable relative thereto, said barrier being an opaque member pivotally mounted between its ends to said other end of said element, a tension spring between one end of said member and said element yieldably urging said barrier member to pivot into light-blocking position when said panel and element are moved upwardly relative to said hollow bar.

9. The improvement of claim 8 wherein said bar is horizontally disposed and is carried for vertical movement on and relative to said ram; said actuating means including a double acting power cylinder mounted on said ram and being operatively connected to said bar to raise and lower it to provide said movement between said "pinch point" covering and remote positions.

10. The improvement of claim 9 wherein said ram has a pair of horizontally spaced vertically oriented guides within which are slidably received slide blocks, said hollow bar being secured to said slide blocks for vertical movement therewith, tension cables connected at one end to said blocks and at the other end to said power cylinder such that reciprocation of said power cylinder results in reciprocal vertical movement of said bar.

11. The improvement of claim 10 wherein said cylinder is mounted on said ram for adjustment vertically, a series of pulleys on said ram for guiding said cables, said vertical adjustment of said cylinder being provided by an elongated element secured at one end to said cylinder and threaded vertically through a supporting block secured to said ram.

12. The improvement of claim 8 wherein there are two such hangers spaced apart and adapted to suspend said panel in a predetermined position beneath said bar.

13. In combination with a power press having fixed and movable dies and a reciprocable ram which carries said movable die, means for reciprocating said ram between spaced first and second positions in which said first position is with said dies closed and said second position is with said dies open in work-receiving condition, said movable die in moving from said second position to said first position passing through a "pinch point" position in which said movable die is spaced from but immediately adjacent to said fixed die just prior to closure, sensing means movable in parallelism with said ram between "pinch point" covering and remote positions for sensing an operator's fingers or hand in the vicinity of said dies when at or near said "pinch point" position and also for guarding against insertion of the operator's fingers or hand into the space of such "pinch point" position, actuating means for moving said sensing means between said "pinch point" covering and remote positions in synchronism with the reciprocating movement of said ram such that said sensing means reaches its "pinch point" covering position substantially simultaneously with said movable die reaching its "pinch point" position and immediately thereafter said sensing means moves to said remote position, said actuating means including operating means interconnecting said ram and sensing means and having a switching cam on one of said ram and a stationary mount and a switch on the other thereof, with the switch having an arm engageable alternately with spaced portions on said switching cam in response to vertical reciprocatory movement of said ram thereby to actuate said sensing means for controlling the movement thereof as aforesaid and further for causing movement of said sensing means upwardly clear of the "pinch point" position of said dies simultaneously with movement of said movable die from said "pinch point" to said closed position whereby upward deflection of a workpiece caused by die closure will avoid interference with said sensing means, stroking means for controlling the reciprocation of said ram and for stopping downward movement of said ram in the direction from said second to said first positions in response to said sensing means sensing the presence of an operator's fingers or hand in proximity to said "pinch point" position of said movable die, said stroking means including a switching device operatively carried by said ram and responsive to sensing by said sensing means of an operator's fingers or hand as aforesaid thereby to cause said ram to stop in its downward movement to prevent closure of said dies, and control means for reversing upwardly said ram immediately upon said stopping thereof, said sensing means including a flat panel lying in a plane essentially parallel to the direction of movement of said ram and which covers substantially the region of the "pinch point" of said dies, said flat panel being movably mounted on said ram, and means connecting said switching device to said panel for operating said switching device as a consequence of movement of said panel relative to said ram upon engagement of said panel with the fingers or hand of an operator, said relative movement constituting the aforesaid sensing of an operator's fingers or hand in the vicinity of the dies, said switching device including an elongated, hollow bar having a light source in one end which directs radiation through said bar to the opposite end, a photo-sensing device in said opposite end having a switching characteristic between "on" and "off" states depending upon whether or not said radiation impinges thereon; said connecting means including a hanger suspending said panel from said bar, said hanger including a light barrier mounted within said bar and movable between light-blocking and light-passing positions, said barrier being movable into light-blocking position in response to upward movement of said panel and into light-passing position upon downward movement into suspended condition of said panel, said stroking means further including a foot-operated switch and said photo-sensing device in an electrical circuit which functions to start downward movement of said ram if said photo-sensing device is receiving radiation as aforesaid and thereafter results in continued downward movement of said ram so long as said radiation impinges said photo-sensing device.

* * * * *